US006961093B2

(12) United States Patent
Higuchi

(10) Patent No.: US 6,961,093 B2
(45) Date of Patent: Nov. 1, 2005

(54) ELECTRONIC CAMERA HAVING AN AUTOMATIC ELECTRIC FLASH FUNCTION

(75) Inventor: Masayu Higuchi, Hachioji (JP)

(73) Assignee: Olympus Corporation (JP)

( * ) Notice: Subject to any disclaimer, the term of this patent is extended or adjusted under 35 U.S.C. 154(b) by 743 days.

(21) Appl. No.: 09/932,652

(22) Filed: Aug. 17, 2001

(65) Prior Publication Data

US 2002/0025165 A1 Feb. 28, 2002

(30) Foreign Application Priority Data

Aug. 21, 2000 (JP) ....................................... 2000-249653

(51) Int. Cl.[7] ................................................ H04N 5/222
(52) U.S. Cl. ..................................... 348/371; 348/229.1
(58) Field of Search ............................ 348/207.99, 362, 348/363, 364, 366, 370, 371, 229.1, 222.1, 255

(56) References Cited

U.S. PATENT DOCUMENTS 6,069,659 A * 5/2000 Nakajima ................... 348/371
6,359,651 B1 * 3/2002 Yokonuma .................. 348/370
6,426,775 B1 * 7/2002 Kurokawa .................. 348/363
6,441,856 B1 * 8/2002 Sugimoto ................... 348/371

FOREIGN PATENT DOCUMENTS

| | | |
|---|---|---|
| JP | 06-121225 | 4/1994 |
| JP | 11-84489 | 3/1999 |
| JP | 2000-134533 | 5/2000 |
| JP | 20000-162679 | 6/2000 |

OTHER PUBLICATIONS

Japanese Office Action corresponding to related Japanese Application No. 2000–249653, dated Sep. 17, 2003 and translation thereof.

* cited by examiner

*Primary Examiner*—Tuan Ho
(74) *Attorney, Agent, or Firm*—Ostrolenk, Faber, Gerb & Soffen, LLP

(57) ABSTRACT

An electronic camera, which is capable of obtaining a more appropriate exposure even when taking a picture by an electric flash photograph, comprises a light emission section for emitting a preliminary light prior to a main photograph and emitting a main light upon taking a picture with respect to a object, a pickup device for receiving an object image in the preliminary light emission and converting a light into electricity to obtain a photograph signal, an amplifying section for amplifying the photograph signal which is obtained by the pickup device and a setting section for setting a gain of the amplifying section and a light emission amount in the main light emission on the basis of the photograph signal obtained in the preliminary light emission.

18 Claims, 4 Drawing Sheets

ELECTRONIC CAMERA HAVING AN AUTOMATIC ELECTRIC FLASH FUNCTION

CROSS-REFERENCE TO RELATED APPLICATIONS

This application is based upon and claims the benefit of priority from the prior Japanese Patent Application No. 2000-249653, filed Aug. 21, 2000, the entire contents of which are incorporated herein by reference.

BACKGROUND OF THE INVENTION

1. Field of the Invention

The present invention generally relates to an electronic camera. More particularly, the present invention relates to an electronic camera having an automatic electric flash function.

2. Description of the Related Art

An electric flash apparatus having an amplifying circuit is disclosed in Jpn. Pat. Appln. KOKAI Publication No. 11-84489. The amplifying circuit receives image signals generated from light beams reflected from an object and amplifies the image signals with different gains. The amount in which light should be emitted to the object to photograph it is calculated from the image signals thus amplified. Hence, light can be emitted in an optimal amount to the object. However, underexposure may occur if the amount of light emitted to the object is insufficient, because the gain is fixed in the process of photographing the object.

A digital camera has been proposed, in which the gain is changed in accordance with the distance to the object in order to increase the distance for which the electric flash apparatus may emit light in an optimal amount (Jpn. Pat. Appln. KOKAI Publication No. 2000-134533). The flash apparatus may not emit light in an optimal amount, because no preliminary light emission is performed to calculate the best possible amount of light which should be emitted to the object.

BRIEF SUMMARY OF THE INVENTION

An object of the present invention is to provide an electronic camera can accomplish better exposure even for an electric flash photographing.

An electronic camera according to the present invention comprises: light emission means for emitting a light to an object, in which the light emission means performs a preliminary light emission and a main light emission; an imaging element for receiving a light reflected from the object during the preliminary light emission and converting the light into an electrical image signal; amplifying means for amplifying the electrical image signal; and setting means for setting a gain for the amplifying means and an amount of light for the main light emission, based on the electrical image signal.

The technical points of the camera are as follows. They can be used in any possible combination.

(1) The setting means increases the gain of the amplifying means if the amount of the light emitted is smaller than a predetermined amount even when light is emitted in a maximal amount to photograph the object.

(2) The photograph mode selecting means is further provided to select a desirable photograph mode in a plurality of photograph modes and the setting means sets the gain of the amplifying means in response to the photograph mode which is selected by the photograph mode selecting means.

(3) The gain of the amplifying means is not changed if the difference or the ratio between the light amount reflected from the object in the preliminary light emission, and the light amount coming from the object when no light is emitted does not exceeds a predetermined value.

(4) A warning is given when the gain of the amplifying means upon emitting the main light is changed by the setting means.

An electronic camera according to the present invention comprises: light emission means for emitting light to an object in present amounts, in which the light emission means performs a preliminary light emission and a main light emission; an imaging element for receiving a light reflected from the object during the preliminary light emission and converting the light into an electrical image signal; amplifying means for amplifying the electrical image signal, with a preset gain; photograph means for comparing an amount of light received when no light is emitted to the object, which is obtained from the electrical image signal, with a predetermined value to evaluate the amount of light received; operating means for operating the light emission means when the evaluation result shows that the received light amount is insufficient; optimum setting value calculating means for obtaining at least one of the main light emission amount and the gain from the amount of the light received when no light is emitted to the object and the amount of the light received during the preliminary light emission; and setting means for setting at least one of the light emission amount obtained during the main light emission and the gain, as a set value.

The technical points of this camera are as follows.

(1) The photograph mode selecting means selects a desirable one of various photograph modes. The optimum setting value calculating means obtains the real amount of the light emission of the light emission means or the gain of the amplifying means, or both, in response to the photograph mode which is selected by the photograph mode selecting means.

(2) The light emission amount controlling means for controlling the light amount of the preliminary emission and the main light emission at prescribed values, respectively, and the gain controlling means for controlling the gain of the amplifying means at a predetermined value are further added to the embodiment.

The present invention provides a method of controlling electric flash photography performed by an electronic camera comprising light emission means for emitting light to an object, in which the light emission means performs a preliminary light emission and a main light emission, an imaging element for receiving a light reflected from the object during the preliminary light emission and converting the light into an electrical image signal, and amplifying means for amplifying the electrical image signal with a preset gain. The method comprises the steps of: comparing an amount of light received when no light is emitted to the object, which is obtained from the electrical image signal, with a predetermined value to evaluate the amount of light received; operating the light emission means when the evaluation result shows that the received light amount is insufficient; obtaining at least one of the main light emission amount and the gain from the amount of the light received when no light is emitted to the object and the amount of the light received during the preliminary light emission; setting at least one of the light emission amount obtained during the main light emission and the gain, as a set value; and photographing the object with the main light emission amount set and the gain set.

According to the present invention, the following effects can be obtained.

Since the preliminary light emission is performed and the gain and the amount of the light emission are set on the basis of the result of the preliminary light emission, an image is capable of being obtained as desired by a photographer. Alternatively, in the case that the amount of the light emission in the main light emission does not satisfy a predetermined amount even when the amount of the light emission in the main light emission is set to the maximum amount, namely, in the case that it is predicted that the underexposure occurs, the inadequate light emission amount can be compensated by increasing the gain, thus generating an image signal at a desired level. Further, the gain of the amplifying means is set in response to the photograph mode, so that an image having an effect desired by the photographer can be obtained.

The difference or the ratio between the light amount reflected from the object in the light emission and the light amount coming from the object when no light is emitted to the object may not more reach a predetermined value, it is supposed that the light from an electric flash does not reach the object, which is located at long distance. Accordingly, this case serves to take a photograph of a night view, so that it is possible to avoid the unnecessary operations such as changing the gain.

An alarm is given when the gain of the amplifying means upon emitting the main light is changed. Hence the operator can recognize that the gain has been changed.

Additionally, according to the present invention, it is possible to take a picture at an optimum exposure, since at least one of the amount of the main light emission and the gain of the amplifying means is obtained to be set on the basis of the receiving light amount of the object which is obtained without the preliminary light emission, and the receiving light amount of the object which is obtained by the preliminary light emission.

Alternatively, the main light emission and the gain of the amplifying means is obtained to be set on the basis of the photograph mode, so that it is possible to take a picture desired by the photographer. The present invention is configured so that a value which is set in this way is controlled, so that it is possible to steadily take a picture.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
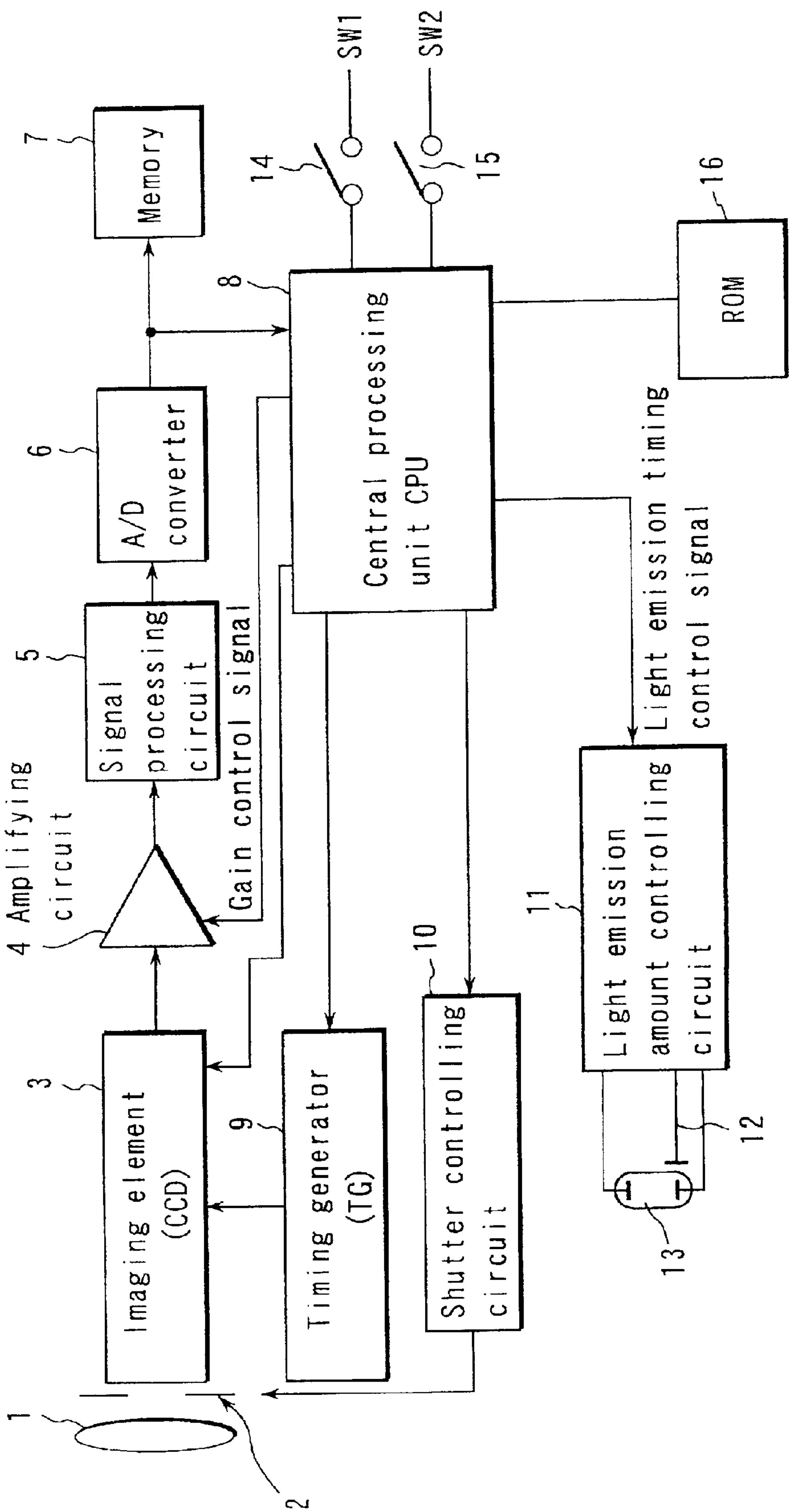
FIG. 1 is a block diagram illustrating a configuration of an electronic camera according to an embodiment of the present invention.

An embodiment of the present invention will be explained with reference to the drawings below. FIG. 1 illustrates a configuration of an electronic camera according to an embodiment of the present invention.

An electronic camera according to the present embodiment comprises a lens 1 for inputting the image of an object, a shutter 2 used as well as an aperture, and a imaging element 3 such as a charge-coupled device (CCD) or the like. The imaging element 3 receives the light reflect from the object prior to the photographing of the object and converts the light into electricity. The imaging element 3 forms an image of the object from the light incident into the lens 1. The camera further comprises an amplifying circuit 4 for amplifying the image signal generated by the imaging element 3, a signal processing circuit 5 for sampling and holding the image signal amplified by the amplifying circuit 4, an A/D converter 6 for converting a signal from the signal processing circuit 5 from analog to digital, a memory 7 for storing an output signal from the A/D converter 6, a central processing unit (CPU) 8 for controlling the driving of respective components of the electronic camera as well as calculating the amount of the light emission of an electric flash light emitting tube 13 on the basis of the A/D converter 6 or the output signal from the memory 7, a timing generator (TG) 9 for generating a timing signal for driving the imaging element 3, a shutter controlling circuit 10 for controlling the shutter 2 under the control of the CPU 8, an electric flash light emitting tube 13 comprising, for example, a Xe tube, a light emission amount controlling circuit 11 for controlling the light emission amount of the electric flash light emitting tube 13 under the control of the CPU 8, a trigger electrode 12 of this electric flash light emitting tube 13, an electric flash light emission mode switch (SW1) 14 which is connected to the CPU 8, a release switch (photographing start switch SW2) 15 which is connected to this CPU 8 and a ROM 16 for storing a predetermined value or the like with respect to the light emission.

The size of the light-receiving area of the imaging element 3 is switched on the basis of the control signal from the CPU 8.

Alternatively, the amplifying circuit 4 amplifies the output signal of the imaging element 3 at a predetermined gain on the basis of the control signal from the CPU 8.

Further, the signal processing circuit 5 carries out a predetermined signal processing such as a gamma correction, a color correction or the like with respect to the image signal which is amplified by the amplifying circuit 4.

Alternatively, the CPU 8 is set to the electric flash light emitting mode by turning the electric flash light emission mode switch 14 ON. Further, by turning the release switch 15 ON, the photographing operation is started under the control of the CPU 8.

Figure 2:
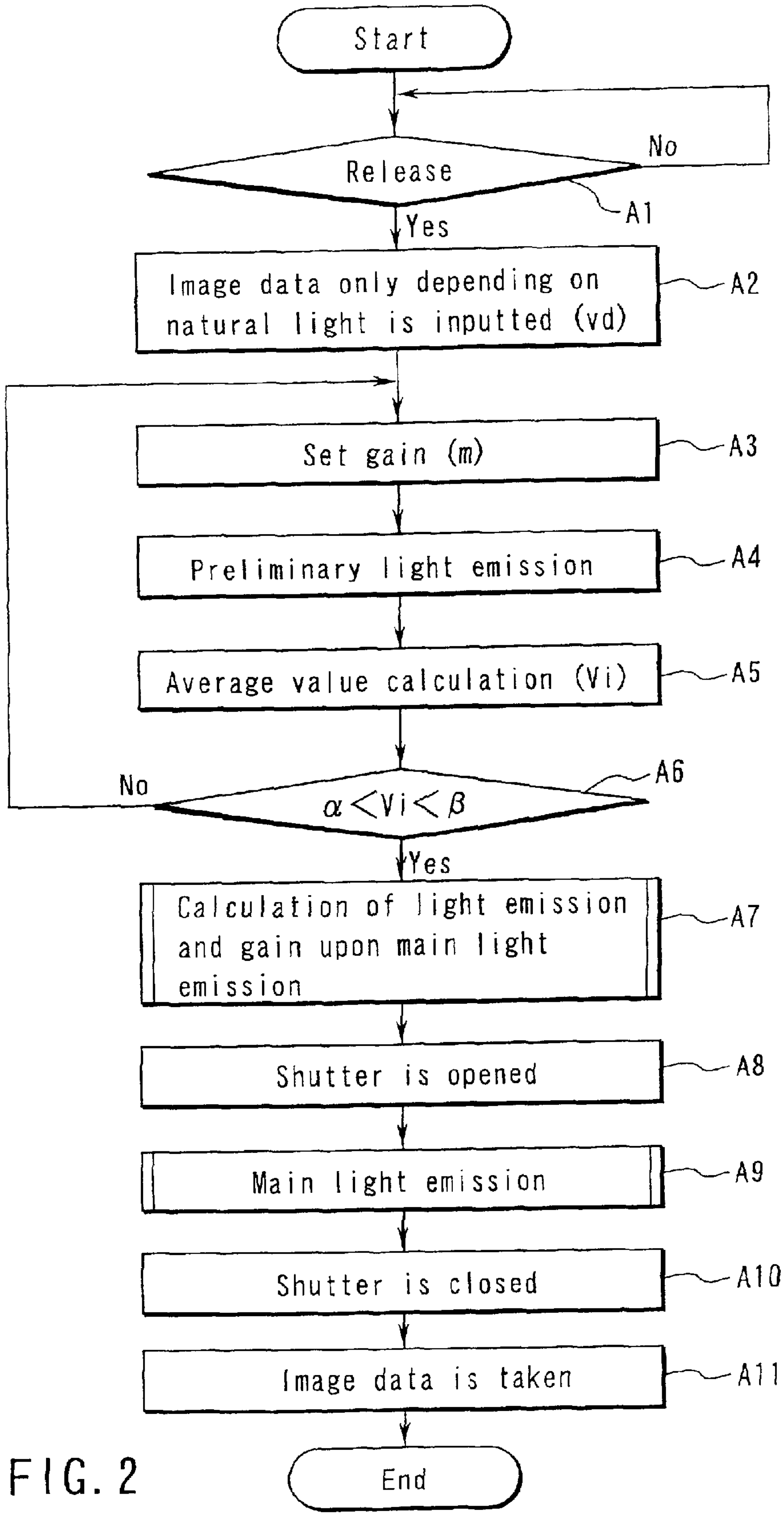
FIG. 2 is a flow chart showing an entire flow from a preliminary light emission to the main light emission.

The operation of the electronic camera which is configured as described above according to the present invention will be explained. The electronic camera according to the present invention is characterized in that it changes the gain of the amplifying circuit 4 when it is detected that the amount of the reflected light from the object is not enough in the main light emission. FIG. 2 is a flow chart showing an entire flow from a preliminary light emission to the main light emission. Further, in the following explanation, it is assumed that the electric flash light emission is carried out.

At first, if the release switch 15 is turned ON (step A1), then, the image data only depending on a natural light is inputted (step A2). Next, the photographing depending on the preliminary light emission (namely, the preliminary photographing) is carried out (from step A3 to step A6). The detailed explanation of this preliminary photographing is as follows.

A gain m of the amplifying circuit 4 is set (step A3). Then, the preliminary light emission is carried out emitting light from the electric flash light emitting tube 13 (step A4). An average value $V_i$ with luminance of the photograph image is calculated (step A5). Then, if this average value $V_i$ is not within a predetermined range, the gain m is reset (step A3) so that the processing to the step A5 is carried out again. If the average value $V_i$ is within a predetermined range, the preliminary photographing is terminated. Then, the amount of the light emission and the gain of the main light emission are calculated. The amount of the light emission and the gain, both calculated, are the amount used in the main light emission (step A7). In this case, the average value $V_i$ is not always within a predetermined range, for example, the preliminary photographing may be carried out with two kinds of the gain m, i.e., m=1 and m=4 so that the amount of the light emission and the gain upon taking a picture at the step A7 may be calculated when the second preliminary photographing is terminated. Additionally, in the following explanation, it is assumed that the preliminary light emission is carried out with two kinds of the gain (m=1 and m=4).

Then, the shutter is opened (step A8), the photograph is carried out by performing the main light emission (step A9) and the shutter is closed (step A10). In this case, when the shutter is closed, the image is taken in the imaging element 3, so that a desired image is capable of being obtained by amplifying the image signal with the gain which is set in the step A7 (step A11).

Figure 3:
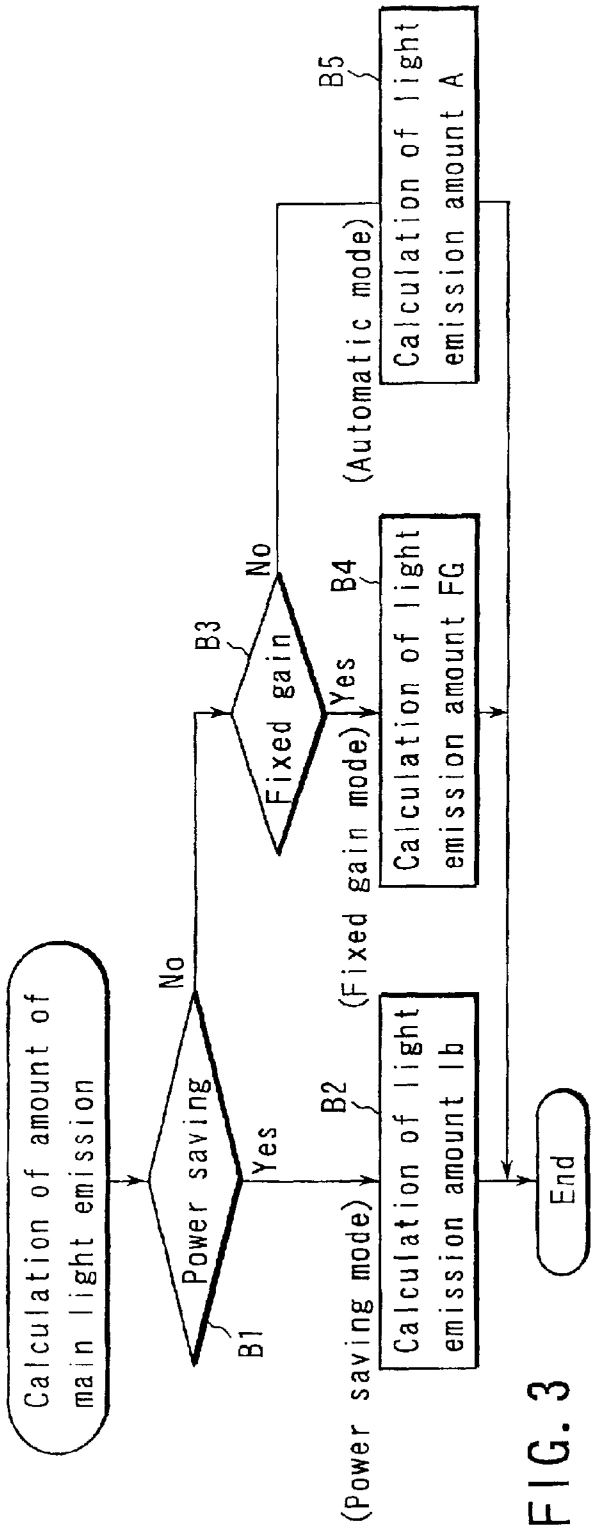
FIG. 3 is a flow chart showing a flow of a method for calculating the amount of a main light emission in response to a photograph mode.

FIG. 3 is a flow chart showing a flow of a method for calculating the amount of a main light emission in response to a photograph mode.

If the photograph mode is a power saving mode (step B1), the calculation of the light emission amount LB is carried out by the power saving mode and, further, the gain m is changed so that the image signal with a predetermined brightness can be obtained (step B2). In the case that the photograph mode is not the power saving mode in the step B1, further, it is determined whether the photograph mode is a fixed gain mode or not (step B3). Then, if the photograph mode is the fixed gain mode, only the light emission amount in the fixed gain mode FG is calculated (step B4). When the photograph mode is not the fixed gain mode in the step B3, it is determined to be an automatic mode, so that a light emission amount A and the gain are calculated on the basis of the preliminary light emission (step B5).

In this way, the light emission amount is calculated in response to each photograph mode.

Figure 4:
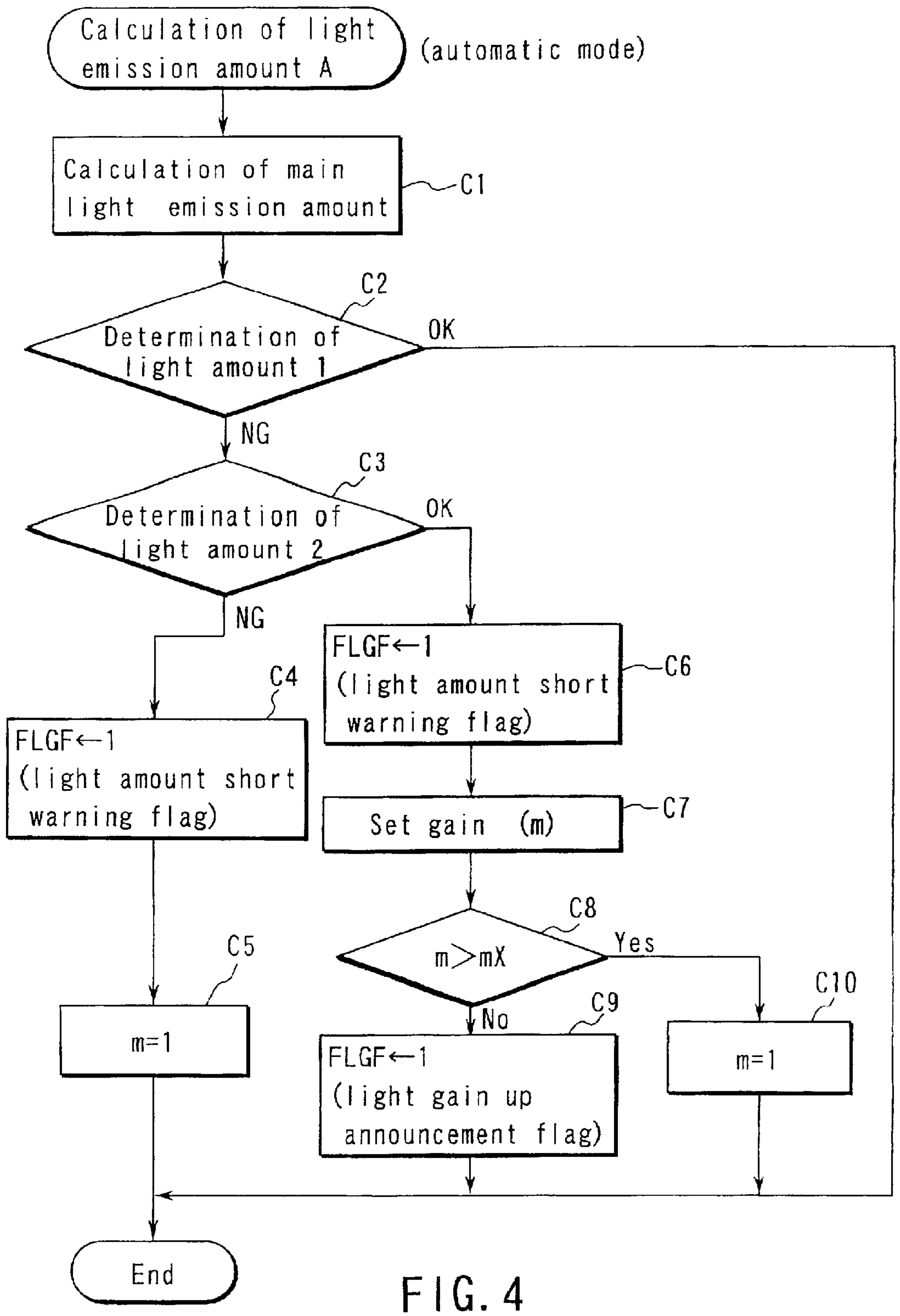
FIG. 4 is a flow chart showing a flow of controlling after the amount of the main light emission is calculated at an automatic mode.

The present invention is characterized in that a predetermined light emission amount is obtained by changing the gain in the case that the light emission amount is not enough, so that the power saving mode and the automatic mode are considered in the present invention. The flow of the controlling after the calculation of the main light emission amount in the automatic mode will be explained with reference to FIG. 4.

At first, the main light emission amount is calculated on the basis of a result of the preliminary photographing (step C1). Here, a first light amount determination is carried out (step C2). In this first determination of the light amount, it is determined whether a sufficient light amount is capable of being obtained only by the light emission from the electric flash. Here, if the light amount is enough, there is no need to increase the gain, so that the processing is terminated at this point. If it is determined that the light amount is not enough in the step C2, the light amount is determined by a second preliminary light emission (step C3). If it is obvious that the appropriate image signal is not capable of being obtained even when the light emission amount of the electric flash is turned to the maximum light emission amount and the gain of the electric flash is turned to the maximum value, for example, as in the case of taking a picture at night, a light amount short warning flag is set (step C4) and the processing is terminated (step C5). In this case, the gain is not changed, namely, m=1 is remained. Next, in the step C3, in the case where it is judged that an appropriate image signal can be obtained by changing the gain, the light amount short warning flag is set (step C6) and the gain m is set to such a value that a predetermined image signal is obtained (step C7). Here, in the case that the gain m exceeds the maximum value $M_x$ of the gain which is capable of being set (step C8), the gain is not capable of being set, so that m=1 is established (step C10). Alternatively, if the value of the gain m is not more than the maximum value $M_x$ in the step C8, an announcement flag for increasing the gain is set (step C9) and the processing is terminated. In the aforementioned embodiment, the energy of the light emission is changed and two-times-preliminary-photographing and two light amount determinations are performed in connection with this. However, according to the present invention, preliminary photographing by the one light emission or more than two times may be available in addition to two-times-preliminary-photographing while changing the light emission energy.

Thus, even in the case that the light emission amount is not enough, an appropriate image signal is capable of being obtained.

Figure 5:
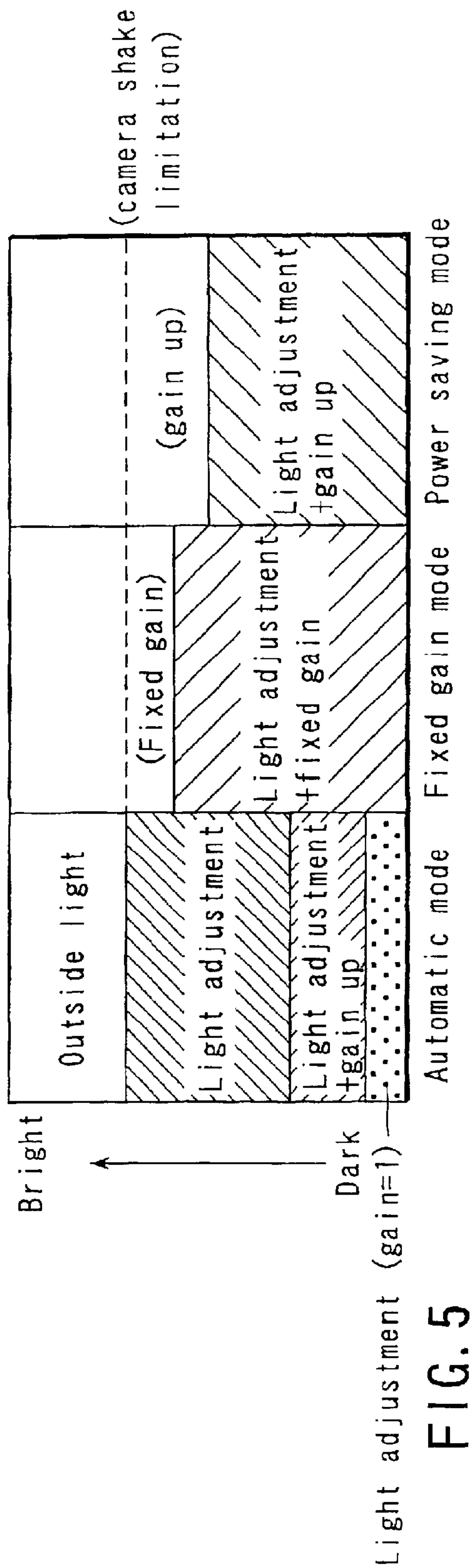
FIG. 5 is a diagram illustrating a relationship between light adjusted and a gain in each photograph mode.

Next, an adjustment of light and an increase in the gain in the automatic mode, the fixed gain mode and the power saving mode will be described with reference to FIG. 5. FIG. 5 is a diagram for indicating a relationship between an adjusted light and a gain in each photograph mode. The amount in which the light should be emitted to provide a desired image signal results in an appropriate exposure at the lowest shutter speed possible, in spite of the camera shake. The amount corresponds to camera shake limitation.

In the automatic mode, at first, the light emission amount by the electric flash is determined so as to obtain the light amount in the camera shake limitation by adjusting the light. In this case, if the light amount does not reach the light amount in the camera shake limitation even when the light emission amount by the electric flash becomes maximum, the light emission amount is adjusted to the light amount in the camera shake limitation by increasing the gain. In this case, for example, when the night view is photographed, the gain m becomes very large so that this value may exceed the maximum value of the gain. In such a case, the photographing is carried out without increasing the gain m. Particularly, this is determined as follows. For example, if the light amount from the object without the preliminary light emission is compared with the light amount from the object depending on the preliminary light emission, there is little increase of the light amount even when the preliminary light emission is carried out in the case that the object is distantly located such as a distant view. Thus, the object should better be determined to be one located away from the camera, such as a night view, than to be one located near the camera, such as a person, if the difference or ratio, in terms of amount, between the light reflected from the object during the preliminary light emission and the light coming from the object when no light is emitted to the object does not exceed the predetermined value.

Since the light emission amount is adjusted only by the light adjustment in the fixed gain mode, the present invention is not applied only to the fixed gain mode. However, the light emission amount by the electric flash is set so as to obtain the light amount in the camera shake limitation only by the light adjustment. In this case, even if the light amount by the light adjustment does not reach the light emission amount in the camera shake limitation by the electric flash, the gain is not changed.

Next, the power saving mode basically aims to decrease the light emission amount, so that the gain is increased in preference to the light emission in the case that the light emission amount is not enough.

As described above, according to the present invention, if the light emission amount is not enough even when the light emission amount is the maximum value after the light is adjusted in the automatic mode, the gain is increased to obtain an appropriate image signal. However, an increase in the gain increases the noise, so that it is preferable that the gain is not increased so much.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic camera comprising:

light emission means for emitting a light to an object, said light emission means performing a preliminary light emission and a main light emission;

an imaging element for receiving a light reflected from the object during the preliminary light emission and converting the light into an electrical image signal;

amplifying means for amplifying the electrical image signal; and setting means for setting a gain for said amplifying means and an amount of light for the main light emission, based on the electrical image signal, said setting means being structured to operate exclusively below a camera shake limitation parameter associated with said electronic camera.

2. The camera according to claim 1, wherein said setting means increases the gain when the electrical image signal fails to have a desired magnitude even if an amount of the light for the main light emission is set to a maximum.

3. The electronic camera according to claim 1, further comprising photograph mode selecting means for selecting a desirable one of a plurality of photograph modes, wherein said setting means sets the gain in accordance with the photograph mode selected by said photograph mode selecting means.

4. The electronic camera according to claim 1, wherein the gain is not changed when a difference or a ratio, in amount between the light reflected from the object during the preliminary light emission, and the light coming from the object when no light is emitted to the object is not more than a predetermined value.

5. The electronic camera according to claim 1, wherein said setting means generates an alarm when the gain is changed in the main light emission.

6. The electronic camera according to claim 2, further comprising photograph mode selecting means for selecting a desirable one of a plurality of photograph modes, wherein said setting means sets the gain in accordance with the photograph mode selected by said photograph mode selecting means.

7. The electronic camera according to claim 2, wherein the gain is not changed when a difference or a ratio, in amount between the light reflected from the object during the preliminary light emission, and the light coming from the object when no light is emitted to the object is not more than a predetermined value.

8. The electronic camera according to claim 2, wherein said setting means generates an alarm when the gain is changed in the main light emission.

9. The electronic camera according to claim 3, wherein the gain is not changed when a difference or a ratio, in amount between the light reflected from the object during the preliminary light emission, and the light coming from the object when no light is emitted to the object is not more than a predetermined value.

10. The electronic camera according to claim 3, wherein said setting means generates an alarm when the gain is changed in the main light emission.

11. The electronic camera according to claim 4, wherein said setting means generates an alarm when the gain is changed in the main light emission.

12. An electronic camera comprising:

light emission means for emitting a light to an object in present amounts, said light emission means performing a preliminary light emission and a main light emission;

an imaging element for receiving a light reflected from the object during the preliminary light emission and converting the light into an electrical image signal;

amplifying means for amplifying the electrical image signal, with a preset gain;

photograph means for comparing an amount of light received when no light is emitted to the object, which is obtained from the electrical image signal, with a predetermined value to evaluate the amount of light received;

operating means for operating the light emission means when an evaluation result shows that said received light amount is insufficient;

optimum setting value calculating means for obtaining at least one of the main light emission amount and the gain from the amount of the light received when no light is emitted to the object and the amount of the light received during the preliminary light emission; and setting means for setting at least one of the light emission amount obtained during the main light emission and the gain, as a set value, said setting means being structured to operate exclusively below a camera shake limitation parameter associated with said electronic camera.

13. An electronic camera comprising:

light emission means for emitting a light to an object in present amounts, said light emission means performing a preliminary light emission and a main light emission;

an imaging element for receiving a light reflected from the object during the preliminary light emission and converting the light into an electrical image signal;

amplifying means for amplifying the electrical image signal, with a preset gain;

photograph mode selecting means for selecting a desirable one of a plurality of photograph modes;

photograph means for comparing an amount of light received when no light is emitted to the object, which is obtained from the electrical image signal, with a predetermined value to evaluate the amount of light received;

operating means for operating the light emission means when an evaluation result shows that said received light amount is insufficient;

optimum setting value calculating means for obtaining at least one of the main light emission amount in said selected photograph mode and the gain from the amount of the light received when no light is emitted to the object and the amount of the light received during the preliminary light emission; and setting means for setting at least one of the light emission amount obtained during the main light emission and the gain, as a set value, said setting means being structured to operate exclusively below a camera shake limitation parameter associated with said electronic camera.

14. The electronic camera according to claim 13, further comprising emission amount control means for controlling a light emission amount during the preliminary light emission and the main light emission to a set value; and gain control means for controlling the gain of said amplifying means to a set value.

15. In a method of controlling an electric flash photography performed by an electronic camera comprising light emission means for emitting a light to an object, said light emission means performing a preliminary light emission and a main light emission, an imaging element for receiving a light reflected from the object during the preliminary light emission and converting the light into an electrical image signal, and amplifying means for amplifying the electrical image signal with a preset gain, said method comprising:

selecting a desirable one of a plurality of photographing modes;

comparing an amount of light received when no light is emitted to the object, which is obtained from the electrical image signal, with a predetermined value to evaluate the amount of light received;

operating the light emission means when an evaluation result shows that the received light amount is insufficient;

obtaining at least one of the main light emission amount and the gain from the amount of the light received when no light is emitted to the object and the amount of the light received during the preliminary light emission;

setting at least one of the light emission amount obtained during the main light emission and the gain, as a set value, while maintaining the operation of the electronic camera below a camera shake limitation parameter thereof; and photographing the object with the main light emission amount set and the gain set.

16. An electronic camera comprising:

a flash portion configured to provide a variable amount of light;

an amplifying portion configured to variably set a sensitivity of a solid-state imaging element;

a mode setting portion configured to be capable of setting a plurality of shooting modes; and a control portion configured to set an amount of light for a main light emission and a gain in the amplifying portion, based on the reflected light amount from an object and a shooting mode set by the mode setting portion, by making the flash portion perform a preliminary light emission in response to the start of a shooting sequence at a brightness below a camera shake limitation.

17. The electronic camera according to claim 16, wherein the mode setting portion includes in said plurality of shooting modes an automatic mode, a fixed gain mode and a power-saving mode.

18. The electronic camera according to claim 16, wherein the control portion issues an alarm when changing the gain in the amplifying portion.

* * * * *